March 31, 1970 W. G. BOPP 3,503,280
BLOCKER DEVICE
Filed Dec. 19, 1967 2 Sheets-Sheet 1

INVENTOR.
WARREN G. BOPP
BY
ATTORNEY

March 31, 1970    W. G. BOPP    3,503,280
BLOCKER DEVICE
Filed Dec. 19, 1967    2 Sheets-Sheet 2
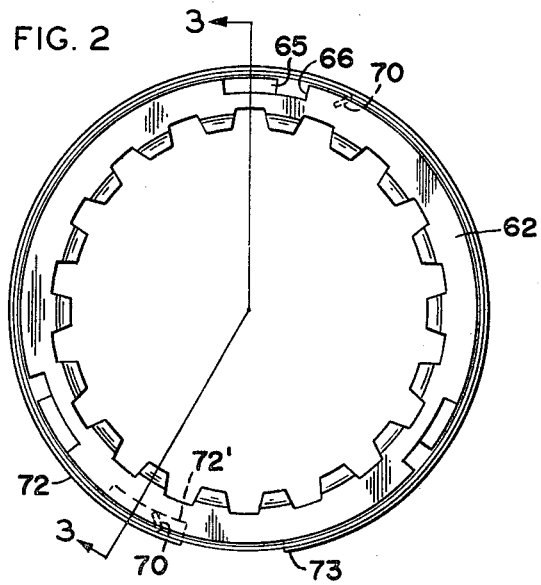
FIG. 2
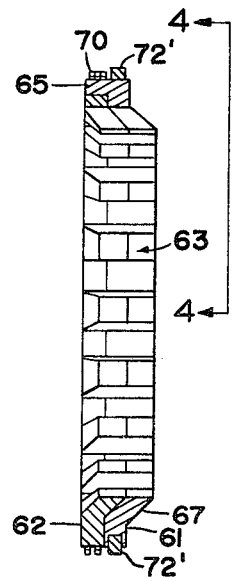
FIG. 3
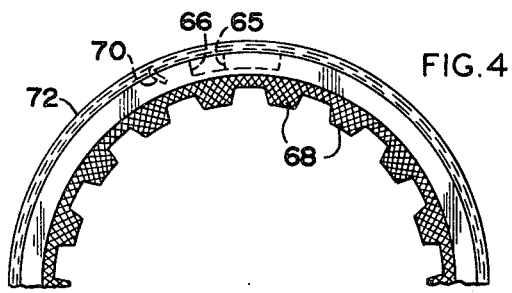
FIG. 4
FIG. 5
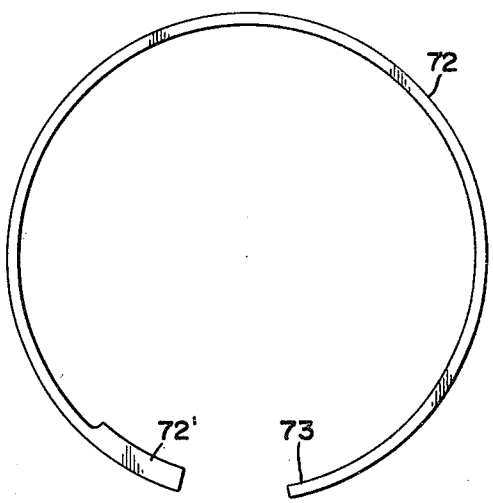
FIG. 6
INVENTOR.
WARREN G. BOPP
BY
ATTORNEY United States Patent Office 3,503,280
Patented Mar. 31, 1970

1

3,503,280
BLOCKER DEVICE
Warren G. Bopp, Farmington, Mich., assignor to Eaton
Yale & Towne Inc., Cleveland, Ohio, a corporation of
Ohio
Filed Dec. 19, 1967, Ser. No. 691,905
Int. Cl. F16h 37/08
U.S. Cl. 74—695                                18 Claims

ABSTRACT OF THE DISCLOSURE

A blocker to prevent engagement of two relatively shiftable parts until their rotation is substantially synchronized. The obstructions of primary and secondary blocker rings overlap during nonsynchronous rotation of the two shiftable parts, but align with one another at the shift interval to permit teeth on one of the shiftable parts to pass through the blocker and engage cooperating teeth on the other shiftable part. At rest and low speed conditions of the two shiftable parts, shifting straight through the blocker is made possible by resilient means built into the unit, as distinguished from conventional blocker arrangements which operate to prevent nonsynchronous shifting at all times.

---

This invention relates to vehicle drive mechanisms and more particularly to selectively shiftable multi-speed transmissions and/or drive axles.

In a multi-speed transmission or drive axle it is common for the shiftable parts, particularly the gear or spline teeth thereof, to be worn or damaged. Such wearing or damage to the clutching and gear or spline teeth is undesirable because of its damaging effect on the operation of the unit, loss of operating time and high maintenance costs.

It is the prime purpose of this invention to provide an arrangement which combats shift part wear of multi-speed transmission or drive axle and accordingly increases the durability of the transmission or drive axle.

It is another main object of this invention to provide a scheme for preventing shift part wear of a multi-speed transmission or drive axle in a simple form of device which insures the greatest durability with the least additional cost per axle, no change to the basic design of the transmission or drive axle, and the least tooling cost and shortest change-over time in converting the present transmission and axle designs to utilize the present invention.

The present invention is particulary suited for use in a multi-speed planetary type drive axle. U.S. Letters Patent to R. C. Russell No. 2,882,752 discloses such a multi-speed planetary type drive axle which has proven to be a sound performer having numerous advantages and economies to the truck owner as better performance under unfavorable conditions, shorter time on runs, less gas and oil consumed, and less maintenance costs. However, in the design of the drive axle disclosed in Patent No. 2,882,752 and other such drive axles presently on the market it is common for the shifting elements to frequently become worn requiring maintenance of the unit prior to the expected service life of the unit. As best can be determined, the undesirable shift part wear is in large part brought on by tooth engagement prior to synchronization of the shifting parts and their meshing counterparts.

2

The present invention is a unique blocker scheme which prevents tooth engagement of shifter parts until synchronization of the meshing parts is attained. The blocker device of the present invention differs from a conventional synchronization arrangement, wherein the synchronization of the meshing parts is effected by special means, in that the present invention prevents shift part mesh until the meshing parts are synchronized. The present invention does not control synchronization of the meshing parts but relies on other means, as driver control of the throttle, to bring the meshing parts to synchronized speeds. By preventing engagement of the meshing parts until such parts are synchronized, the blocker device of the present invention effectively combats shift part wear which accordingly results in increased durability of the unit.

Accordingly, it is a further main object of the present invention to provide a blocker device for use in a multi-speed or drive axle mechanism which prevents engagement of meshing components of the mechanism until the components have attained synchronized speeds.

It is another prime object of the present invention to provide a blocker device of the above paragraph having a plurality of internally splined annular members having cooperating means permitting limited relative rotation of adjacent annular members from a first aligned position to a non-aligned second position, resilient means connected at its ends to adjacent annular members tending to maintain said annular members in an aligned first position, the blocker device permitting a shift gear member to pass through said annular members when in said aligned first position when said shift gear member and said annular members are synchronized, effecting said limited relative rotation of adjacent annular members to said non-aligned second position when non-synchronized thereby blocking any further shifting movement of the gear member.

It is further the object of the present invention to provide a blocker device which is not effective as a blocking means when the vehicle is at rest or is operated at very low speeds and allows straight-through shifting of the shift gear member without regard for synchronization in said low speed operating ranges, but which is effective to block any non-synchronized shifting movement of the shift member when the vehicle is operated at speeds above said low speed operating range.

These and other objects will become apparent from the following description and appended claims when read in connection with the attached drawings, wherein:

FIGURE 2 is a plan view of the blocker of invention;

FIGURE 3 is a sectional view taken along line 3—3 of FIGURE 2;

FIGURE 4 is an end elevational view taken along line 4—4 of FIGURE 3 showing the annular members in their aligned relationship;

FIGURE 5 is an end elevational view corresponding to FIGURE 4 showing the annular members in their non-aligned relationship, and FIGURE 6 is a plan view of the clutch spring 72.

Figure 1:
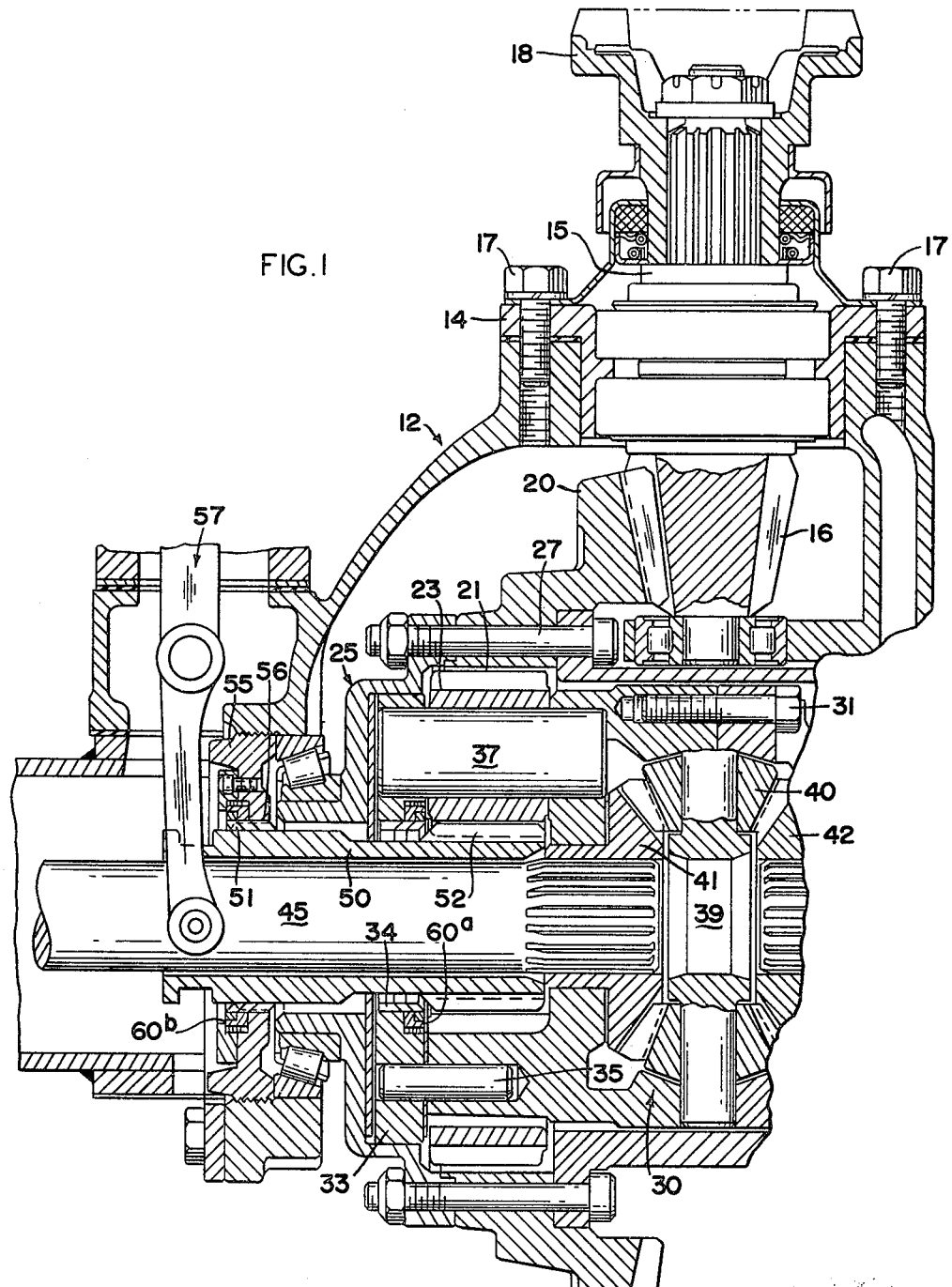
FIGURE 1 is a horizontal section of a preferred embodiment of the present invention.

As seen in FIGURE 1, a multi-speed, planetary drive axle incorporating the present invention comprises a housing 12 on the forward portion of which a bearing cage 14 rotatably mounts an engine driven shaft 15 having an integral bevel pinion 16, bearing cage 14 being mounted on housing 12 as by bolts 17. Splined to the outer or forward end of shaft 15 is a flange coupling 18 which provides a driving connection to an engine driven propeller shift (not shown). As disclosed in aforementioned Patent No. 2,882,752 power comes in through bevel pinion 16 and is transferred to the bevel drive ring gear 20, a reduction in speed taking place in this transfer. Ring gear 20 has integral gear teeth 21; idler pinions or planetary gears 23, of which there are four, mesh with the internal teeth 21 of ring gear 20. Ring gear 20 is non-rotatably mounted to the gear support case 25 by bolt means 27. Rotatably mounted in the gear support case 25 is a rotatable differential cage generally indicated as 30, which comprises a pair of cage halves held in clamping engagement by means of a plurality of bolts 31 in a conventional manner. High speed clutch plate 33, having internal gear teeth 34, is supported to the differential case 30 by pin means 35 and therefore rotates at the rotational speed of the differential case 30. The idler pinions or planetary gears 23 fit into the left hand portion of the differential case 30 and are carried by pins 37 mounted between the differential case and the high speed clutch plate 33.

Non-rotatably mounted within the differential case 30 is a differential spider 39 which mounts, at its spaced arms, a bevel pinion 40 in constant mesh with both bevel side gears 41 and 42 (partially shown). The side gears 41 and 42 are internally splined to drivingly engage splined ends of axle shafts 45 and as disclosed in Patent No. 2,882,752 power is delivered to the wheels through axle shafts 45 after passing through the planetary gears and differential housed in gear support casing 25.

Sliding clutch gear or sun gear member 50 is mounted about axle shaft 45 for axial movement thereon. Sun gear 50 is provided with external outer teeth 51 for meshing engagement with teeth 56 of a brake plate 55 non-rotatably mounted to stationary housing 12, and inner teeth 52 for meshing engagement with the high speed clutch plate teeth 34. As shown in FIGURE 1, outer teeth 51 of sun gear 50 are in meshing engagement with teeth 56 of brake plate 55; in this selective speed ratio, the sun gear 50 is held in a stationary, non-rotating position with the brake plate 55 and stationary housing 12. With the sun gear 50 held stationary, the idler pinions or planetary gears 23 revolve on pins 37 because they are meshed with the teeth 52 of sun gear 50, the planetary gears will walk around the sun gear 50. In doing so, the planetary gears 23 will carry the differential cases 30 with them, since the pins 37 are fitted into the differential case. A secondary reduction here takes place (first reduction between bevel pinion and ring gear as described hereinabove) between the ring gear and the differential which in turn drives the axle shaft 45. The position or the selective speed ratio of the multi-speed assembly, as shown in FIGURE 1, which effects a secondary reduction between the input bevel pinion and the differential, as before described, is referred to as the low speed condition.

A shifting mechanism generally indicated as 57 is provided to effect axial shifting of the sun gear 50. The shifting mechanism can be actuated by conventional air, hydraulic, electric or air/electric shift control systems of the type which are utilized in effecting shifting of a multi-speed axle or transmission arrangement. Such shifting arrangements are disclosed in U.S. Patent No. 3,146,842 and application Ser. No. 415,431, now Patent No. 3,373,-831, both of which are assigned to the same assignee as the present invention.

Through driver control, the shifting mechanism 57 effects a shifting of the sun gear 50 to the left so that outer teeth 51 are free of the brake plate 55. The inner teeth 52 of sun gear 50 would still be in mesh with idler pinions 23 and also in mesh with the high speed clutch plate 33. In this position, the inner teeth 52 of sun gear 50 act as a lock on the idler pinions or planetary gears 23, and they cannot rotate. In fact, in this position the ring gear 20, the support case 25, the planetary gears 23 and the differential 30 are locked together and function as a single piece. In this second selective speed ratio or high range condition, the power is transmitted from the ring gear 20 directly to the differential gears and through them to the axle shafts. In this high range condition, only one reduction, between the bevel pinion 16 and the bevel ring gear 20, takes place and hence a fast axle speed results.

As before discussed in the objects of the present invention, in a planetary type multi-speed assembly as shown in FIGURE 1, the shift part, or sun gear 50, often has its gear teeth worn or damaged during shifting because of the engagement of the meshing parts before synchronization thereof. As can be readily seen from inspection of FIGURE 1 and in light of the above description of operation of the multi-speed assembly therein disclosed, it is preferable to synchronize the sun gear with the parts to which it will mesh, namely the high speed clutch plate and the brake plate. In shifting the sun gear from the low speed condition shown in FIGURE 1 to the high speed condition, the non-rotating sun gear 50 must be On the other hand, in shifting from the high speed condition (not shown) to the low speed condition shown in FIGURE 1, the rotating sun gear 50 must mesh with the non-rotating brake plate 55.

The present invention effectively prevents any engagement of the sun gear with the high speed clutch plate or the brake plate before synchronization by providing identical blocking means, generally indicated as 60a and 60b, before the plates 33 and 55 respectively. As best seen in FIGURE 3, the blocking means is comprised of nested annular members 61 and 62 which are each internally splined, generally indicated as 63. The annular members 61 and 62 are indexed by means of a series of axial tabs 65 on one of the annular members which are received in axial slots 66 of the adjacent annular member. The cooperating tab and slot arrangement permits an indexing of the annular members from a first position in which annular members and their internal splines are aligned (as in FIG. 4) and a second position wherein the annular members and their internal splines are not aligned (as in FIG. 5). A circular clock spring 70 is provided having a series of windings, shown as three, about the annular members 61 and 62; spring 70 is anchored at its opposite ends to adjacent annular members and tends to maintain the annular members in their indexed first or aligned position. A clutch spring 72 has a tab 72' fitted in a slot in the annular member 61 and having its other end 73 adapted for engagement with the annular housing which receives the blocking means 60a and 60b. As described above, the blocking means 60a and 60b will be received in annular portions of the high speed clutch plate 33 and brake plate 55, respectively. The clutch spring acts as a one-way clutch in freely permitting rotational movement of the annular members in one direction while resisting, but not preventing, rotation of the annular members in the opposite direction.

The radial face 67 of annular member 61 engages a corresponding radial face of the high speed clutch plate and the brake plate. Radial face 67 of annular member 61 may be provided with a frictional surface 68 which tends to resist, but not prevent, rotational movement of the annular member 61 relative the radial face of the high speed clutch plate and the brake plate. Annular member 62 also may be provided with a similar frictional surface 69 for engagement with the surface of annular member 61 and effects a frictional drag impeding relative rotational movement of annular members 61 and 62.

Operation

Presuming the vehicle is being operated in the low speed range or condition, and that it is desired to effect a shifting of the mechanism to its high speed range, it becomes necessary to shift axially the sun gear 50 out of engagement with the teeth 56 of the brake plate 55 and into engagement with the teeth 34 of high speed clutch plate 33 through the blocking means 60a to complete the shift operation. To effect a shifting operation from the low speed range to the high speed range, the vehicle operator must first energize the shifting mechanism 57 in the usual manner and secondly he must release the accelerator or the foot throttle control to unload the outer teeth 51 of sun gear 50 and to effect a decrease in engine speed, keeping his foot off the accelerator pedal until the shift operation is completed. It will be noted that the movements of the vehicle operator to effect the shift operation are the same whether a blocking device is utilized or not.

In the low speed range, just before the shift operation begins, the sun gear 50 is in a non-rotating condition, as shown in FIGURE 1, because of its outer teeth 51 meshing with the teeth 56 of the brake plate 55. The high speed clutch plate 33 is rotating at wheel or differential speed of the vehicle. If at this time the shifting gear mechanism 57 is energized and if the vehicle operator has released the accelerator pedal, the sun gear 50 is shifted to the left, its inner teeth 52 engaging the annular member 62 of blocking means 60a, said means 60a being driven at this time at the same rotational speed as the high speed clutch plate 33. Upon engagement of the inner teeth 52 of sun gear 50 (non-rotating) and annular member 62 of blocking means 60a (rotating), the sun gear effects an indexing or relative rotation of annular member 62 relative to annular member 61 to their non-aligned position of FIGURE 5. In this non-aligned position the splines of annular member 61 prevent further axial movement of sun gear member 50 and its inner teeth through blocking means 60a. However, the vehicle operator by not engaging the accelerator pedal at this time allows the engine to continue to decrease engine speed until it becomes possible to complete the shift operation from the low speed range to the high speed range. Releasing the accelerator releases torque and unloads the outer teeth 51 of the sun gear 50 and decreases engine speed, causing the ring gear 20 to slow down and the sun gear 50 which is held in a neutral position by the blocker to begin to rotate and to increase in rotational speed. At this time the direction of rotation of the sun gear 50 and the high speed clutch plate 33 is the same, and the sun gear 50 continues to increase in speed until it is synchronized with the high speed clutch plate 33. At synchronous speed, when shifting from low to high, the sun gear 50, high speed clutch plate 33, the support case 25, differential 30, and the blocker means 60a are all rotating at the same speed in the same direction. As the sun gear 50 continues to increase in speed and passes slightly beyond synchronous speed, it is brought off the blocker, that is, the annular member 62 rotates relative to the annular member 61 until the two annular members assume their aligned position as shown in FIGURE 4. At this time the sun gear 50, still under the influence of the shifting mechanism 57, slides over the splines 63 through the blocking means 60a and into contact with the high speed clutch plate. If the inner teeth 52 of the sun gear and the teeth 34 of the high speed clutch plate are aligned at this time, a meshing engagement will occur. If not, a further slight rotational adjustment of the sun gear 50 relative to the high speed clutch plate 33 will occur, at which time the inner teeth 52 of the sun gear will engage the teeth 34 of the high speed clutch to complete the shift operation. Note that the relative realignment of the two annular members from their unaligned to their aligned position when shifting from the low speed range to the high speed range is a function of gear rotation and the relative instantaneous speeds of the sun gear 50, blocking means 60a, and the high speed clutch plate 33.

To shift from the high speed range to the low speed range it is necessary to disengage the inner teeth 52 of the rotating sun gear from the high speed clutch plate and shift the sun gear 50 to the right through blocking means 60b to bring the outer teeth 51 of the sun gear into engagement with the teeth 56 of the brake plate 55. Both blocking means 60b and the brake plate are normally stationary and non-rotating.

To effect the shift operation the vehicle driver in this instance must first energize shifting mechanism 57 and secondly, he must momentarily release his foot from the foot throttle control or accelerator to unload the high speed clutch teeth and allow the sun gear to move and engage blocker 60b after which time he depreses the accelerator to cause the engine to increase in speed. Again the sequence of operations performed by the vehicle operator to effect the shift from the high speed range to the low speed range is the same as if there were no blocker arrangement in the gear train.

Upon energization of the shifting mechanism 57 and as the driver releases the foot throttle control, sun gear 50 is shifted axially to the right out of engagement with the high speed clutch plate 33 and blocking means 60a into engagement with blocking means 60b. Upon engagement, the rotating sun gear outer teeth 51 effect a rotation of annular member 62 of blocking means 60b relative to annular member 61 to their non-aligned relationship. At this time the internal splines 63 of annular member 61 block any further axial shifting of the sun gear 50 through blocking means 60b as long as the two annular members 61 and 62 remain non-aligned.

At this time the sun gear 50 is freewheeling, that is, in neutral and is decelerating; and the increase in engine speed is causing ring gear 20 to increase in rotational speed, while the sun gear 50 continues to slow down to a stop through the intermediate rotating planetary gears 23. Thus, the sun gear 50 is caused to be synchronized with the stationary brake plate 55. However, immediately upon the sun gear's rotational speed reaching zero, the direction of rotation of the sun gear is reversed and sun gear begins to slowly rotate in the opposite direction at which time the sun gear rotates annular member 62 relative to the rear annular member 61 until the two annular members assume their aligned position with clutch spring 72 preventing rotation of annular member 61 at this time. When annular members 61 and 62 assume their aligned position, the sun gear 50 can pass through.

With the two annular members 61 and 62 aligned, sun gear 50, under the influence of shifting mechanism 57, is shifted through blocking means 60b into contact with the brake plate 55. If the brake plate teeth 56 are aligned at this time with the outer sun gear teeth 51, a meshing engagement is effected; if not, the sun gear will rotate slightly, the clutch spring 72 allowing slight rotation but preventing spinning of blocking means 60b, until the sun gear outer teeth 51 are brought into full engagement with the brake plate teeth 56. Note that in this latter instance, the sun gear is unloaded and rotating very slowly so that its slightl rotational adjustment to become fully aligned with the brake plate teeth 56 and subsequent meshing engagement with the brake plate 55 causes no damage to either set of gear teeth. As before discussed, in the low speed range condition (as seen in FIG. 1), the sun gear 50 is held stationary by the brake plate 55 and the idler pinions or planetary gears 23 walk around the sun gear teeth 52 and carry the differential cases 30, effecting a secondary reduction of the assembly.

The above-described blocking arrangement possesses two further operation modes, that is, when the vehicle is at rest, or when the vehicle is operating at very low speeds, such as less than 10 to 12 miles per hour. The exact limiting speed will be a function of the design of the gear train, the clutch spring 72, the clock spring 70 and the mass of the rear blocker plate 61. In these two specific instances the clock spring 70 operates to prevent the blocking means from performing the blocking function by resisting relative rotation of the two annular members 61 and 62 toward their non-aligned relationship. Thus, in these particular modes of operation it is possible to shift the sun gear through the blocking means at all times without concern for synchronization of the rotational speed of the sun gear with the rotational speed of the clutch plate as the two annular members, at this time, are always held in their aligned relationship. Consequently, shifting in these two described modes of operation is the same as if there were no intermediate blocking arrangements between the two clutch plates and the sun gear 50. This differs from conventional blocker arrangements which operate to prevent nonsynchronous shifting at all times.

Presuming the vehicle has decelerated to a speed less than the 10 to 12 mile per hour limiting speed and that it is desired to shift from the high speed condition to the low speed condition, the shift mechanism 57 is energized and the rotating sun gear 50 is caused to shift axially to the left into engagement with blocking means 60b. Unlike during the previous described shift operation from the high speed condition to the low speed condition, the rotating sun gear 50 upon engagement with blocking means 60b does not effect a rotation of annular member 62 relative to annular member 61 to their non-aligned relationship. This is so because the rotational inertial forces of the rotating sun gear 50 are insufficient to overcome the resistance of clock spring 70 and cause relative movement of the two annular members from their first aligned relationship to their second non-aligned relationship. Consequently, both annular members of blocking means 60b are caused to rotate as a unit while remaining aligned thereby allowing the sun gear to shift through blocking means 60b without regard for synchronization of the meshing parts.

Whether the shift operation occurs while vehicle speed is less than the 10 to 12 mile per hour limiting speed, or the shift operation occurs while the vehicle is at rest, essentially the above-described condition exists to prevent the blocking means 60b or 60a from operating as a blocker, that is, that the relative inertial forces generated by the sun gear 50 during the shift operation are insufficient to overcome the forces developed by the clock spring 70 which tends, at these times, to resist relative rotation of the two annular members from their first aligned relationship to their second non-aligned relationship. Attention will now be focused on clutch spring 72 and its operational characteristics. As can best be seen in FIGURE 6, clutch spring 72 is annular in form, though not a closed ring, and has an inwardly projecting radial tab 72'. The spring 72 is pre-loaded to exert a force in the outward direction, that is, it is made slightly larger than the diameter of annular member 61, about which it is circumferentially disposed, tab 72' being inserted in an axial slot of annular member 61.

The clutch spring 72 functions as a one-way clutch producing a differential force depending on the direction of rotation of annular member 61. Rotation of clutch spring 72 in the counterclockwise direction (as viewed in FIGURE 6) causes the spring to contract allowing relatively free rotation of the two annular members to their favored aligned relationship. However, rotation of clutch spring 72 in the clockwise direction causes the spring to expand and resist relative rotation of the annular member 61 with respect to housing 33 or 55. Whenever the inertial force of the annular member 61 combined with drag of clutch spring 72 are less than the force produced by the clock spring, annular member 61 of the blocking means will resist and prevent relative rotation of the two annular members from their aligned relationship to their non-aligned relationship, thereby preventing the blocking means from functioning to prevent non-synchronous through shifting of the sun gear. This condition of low-inertial blocker forces, as earlier noted, occurs only while the vehicle is at rest or operating at very low speeds, that is, less than 10 to 12 miles per hour.

It is the existence of these low inertial forces which makes shifting straight-through the blocking means possible during the above-described vehicle low speed conditions without regard for synchronization. These forces are of such a low magnitude that they can be absorbed by the gear teeth without causing wear or other damage to the teeth.

What is claimed is:
1. A blocker device comprising:
at least two annular members each having obstructions thereon,
cooperating means for enabling limited rotational movement of said annular members relative to each other between positions whereat said obstructions are disposed in aligned and non-aligned relationship on rotational movement of the annular members in one and opposed rotational directions respectively, and
resilient means for controlling the limited relative rotational movement of said annular members, said resilient means normally tending to maintain the obstructions of the annular members in said aligned relationship, and for resisting, though not preventing, relative rotational movement of the annular members in said opposite rotational direction while permitting relative rotational movement thereof in said one rotational direction.
2. The blocker device as set forth in claim 1 wherein:
said resilient means include first means connected at one end to one of said annular members and at the other end to the other of said annular members and tending to maintain said annular members in aligned relationship, and
second resilient means connected at one end to one of said annular members with its other end having means engaging said cooperating means, permitting relative rotation of said annular members in said one rotational direction and resisting, though not preventing, movement of the members in said opposite direction while permitting movement thereof in said one direction.
3. A blocker device comprising:
a plurality of members each having obstructions thereon,
cooperating means for enabling movement of said members relative to each other between positions whereat said obstructions are disposed in aligned and non-aligned relationship on movement of the members in one and opposed directions respectively, and
resilient means for controlling the movement of said members, said resilient means normally tending to maintain the obstructions of the members in said aligned relationship, and for resisting, though not preventing, movement of the members in said opposite direction while permitting movement thereof in said one direction.
4. The blocker device as set forth in claim 3 wherein:
said members are each annular in configuration, and said movement of the members is generally rotational.
5. The blocker device as set forth in claim 3 wherein the plurality of members comprises two annular members and said resilient means include means connected at one end to one of said annular members and at the other end to the other of said annular members and tending to maintain said annular members in aligned relationship.
6. The blocker device as set forth in claim 5 wherein:
said resilient means include second resilient means connected at one end to one of said annular members with its other end having means engaging said other member, permitting relative rotation of said annular members in said one rotational direction and resisting, though not preventing, movement of the members in said opposite direction while permitting movement thereof in said one direction.
7. The blocker device as set forth in claim 4 wherein each of said members is provided with a radial face that is in engagement with the radial face of the member that is disposed adjacent thereto, and each of said radial faces having a friction generating surface which substantially resists, though does not prevent, relative rotational movement between said radial face of the adjacent member by generating a frictional force therebetween.

8. The blocker device as set forth in claim 7 wherein:
said radial faces of adjacent annular members are in nested relationship to one another, and
the radial face of at least one of the adjacent annular members having a friction generating surface which resists, though does not prevent, relative rotational movement between the adjacent annular members by generating a frictional force therebetween.

9. The blocker device as set forth in claim 3 wherein:
said cooperating means for enabling limited relative rotation of said annular members relative to one another is comprised of a series of axial tabs on one annular member extending into receiving slots in the next adjacent annular member.

10. In a shift mechanism:
a first gear member having external gear teeth adapted to be axially shifted through a plurality of internally splined annular members into mesh with an internally splined clutch member,
said annular members rotatably mounted to said clutch member,
adjacent annular members provided with cooperating means permitting limited relative rotation to one another between an indexed first position wherein their internal splines are aligned and a second position wherein their internal splines are non-aligned,
first resilient means secured at its ends to adjacent annular members to rotate said members in one direction to the indexed first position wherein their internal splines are aligned,
second resilient means connected to one of said annular members and engaging said clutch member resisting, though not preventing, relative rotational movement of the annular members in an opposite rotational direction while permitting relative rotational movement thereof in said one rotational direction,
said first gear member effecting relative rotation of said annular members against said second resilient means to said second position when said first gear member and said annular members are rotating at non-synchronized speeds, and
said clutch member effecting relative rotation of said annular members to said indexed first position when said first gear member and said annular members are rotating at substantially synchronized speeds permitting said first gear member to be axially shifted through said annular members.

11. The transmission blocker device as set forth in claim 10 wherein:
said cooperating means permitting limited relative rotation of the adjacent annular members is comprised of a series of axial tabs on one annular member extending into receiving slots of the next adjacent annular member.

12. The transmission blocker device as set forth in claim 11 wherein:
said annular members are mounted in an annular recess in the clutch plate and the clutch plate is carried by the axle of a second gear member, and said second resilient means having one end secured to an annular member and its other end having means engaging the annular recess permitting the relative rotation of said annular member to said clutch plate in one direction and resisting, but not preventing, relative rotation of the annular member relative to said clutch plate in the opposite direction.

13. In a multi-speed transmission:
a housing non-rotatably supporting a brake plate having internal teeth;
a casing rotatably mounted in said housing, a ring gear fixedly secured to said casing and rotatable therewith, input means operatively connected to said ring gear for imparting driving torque thereto;
a carrier rotatably mounted in said casing and non-rotatably connected to the output means of said transmission, said carrier rotatably supporting a plurality of planetary gears in constant mesh with said ring gear and non-rotatably supporting a clutch plate having internal teeth;
an axially shiftable sun gear movable between a first position in meshing engagement with said housing brake plate teeth and a second position in meshing engagement with said carrier clutch plate teeth;
blocking means respectively rotatably supported by said carrier clutch plate adjacent to said carrier clutch plate teeth, and by said housing brake plate adjacent to said housing brake plate teeth so that said sun gear must pass through one of said carrier or housing blocking means upon axial movement between said first and second positions, said blocking means being comprised of internally splined annular members, and cooperating means permitting limited relative rotation of adjacent annular members from an aligned first position to a non-aligned second position, and resilient means connected to said adjacent annular members tending to maintain said annular members in said aligned first position;
said sun gear adapted to pass through said annular members when synchronized therewith and effecting said limited relative rotation of said adjacent annular members to said non-aligned second position when said sun gear and said annular members are rotating at non-synchronized speeds; and
effecting alignment of said annular members to said second position when said sun gear and annular members are synchronized.

14. The multi-speed transmission as set forth in claim 13 wherein:
at least one of adjacent annular members of said blocking means is provided with a friction generating surface to generate a frictional force opposing any relative rotation of the adjacent annular members.

15. The multi-speed transmission as set forth in claim 14 wherein:
the internal splines of adjacent annular members engage each other in nested relationship, a surface of the internal splines of at least one of the adjacent annular members having said friction generating surface.

16. The multi-speed transmission as set forth in claim 13 wherein:
said housing has a radial flange engaged by the adjacent axial face of the teeth of the immediately adjacent annular member, said axial face of said teeth having a friction generating surface which substantially limits any relative rotation movement between the housing flange and said immediately adjacent annular member by generating a friction force therebetween in opposition to any such movement.

17. The multi-speed transmission as set forth in claim 13 wherein:
said annular members cooperating means permitting limited relative rotation of said annular members is comprised of a series of axial tabs on one annular member extending into receiving slots in the next adjacent annular member.

18. The multi-speed transmission as set forth in claim 14 wherein:
said resilient means provides sufficient force between said splined annular members to overcome low inertial forces provided by transmission operation at zero and low speeds, to maintain said annular members in aligned relation so that shifting of said transmission is effected without operation of said blocking means.

References Cited

UNITED STATES PATENTS

| | | | |
|---|---|---|---|
| 2,339,512 | 1/1944 | Peterson et al. | 192—53 |
| 2,521,730 | 9/1950 | Keese | 192—53 |
| 3,175,413 | 3/1965 | Peras | 74—339 |
| 3,195,371 | 7/1965 | Christie | 74—695 |
| 3,270,843 | 9/1966 | Ivanchich | 192—53 |
| 3,347,347 | 10/1967 | Hetmann | 192—53 |

ARTHUR T. McKEON, Primary Examiner

U.S. Cl. X.R.

74—339; 192—53, 67

PO-1050
(5/69)

UNITED STATES PATENT OFFICE
CERTIFICATE OF CORRECTION

Patent No. 3,503,280               Dated March 31, 1970

Inventor(s) Warren G. Bopp

It is certified that error appears in the above-identified patent and that said Letters Patent are hereby corrected as shown below:

Col. 4 - line 21
    The words "meshed with the rotating high speed clutch plate teeth 34." omitted after the word "be".

Col. 6 - line 53
    The word "slightl" should read --slight--.

Signed and sealed this 3rd day of November 1970.

(SEAL)
Attest:

EDWARD M. FLETCHER, JR.
Attesting Officer

WILLIAM E. SCHUYLER, JR.
Commissioner of Patents